(12) United States Patent
Lin et al.

(10) Patent No.: US 10,356,288 B2
(45) Date of Patent: Jul. 16, 2019

(54) ELECTRONIC DEVICE COMPRISING A SUPPORT DEVICE TO WHICH AN IMAGING DEVICE IS COUPLED

(71) Applicant: LENOVO (BEIJING) LIMITED, Beijing (CN)

(72) Inventors: Bai Lin, Beijing (CN); Rui Wang, Beijing (CN); Ya Zhang, Beijing (CN); Yan Ma, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 219 days.

(21) Appl. No.: 15/084,957

(22) Filed: Mar. 30, 2016

(65) Prior Publication Data
US 2017/0195528 A1 Jul. 6, 2017

(30) Foreign Application Priority Data

Dec. 31, 2015 (CN) .......................... 2015 1 1032747

(51) Int. Cl.
*H04N 5/225* (2006.01)
*F16M 13/02* (2006.01)
(Continued)

(52) U.S. Cl.
CPC ........ *H04N 5/2251* (2013.01); *F16M 13/022* (2013.01); *G03B 17/561* (2013.01); *G03B 15/02* (2013.01)

(58) Field of Classification Search
CPC .... H04N 5/2251; G03B 17/561; G03B 15/02; F16M 13/022
See application file for complete search history.

(56) References Cited

U.S. PATENT DOCUMENTS 6,873,356 B1  3/2005  Kanbe et al.
2002/0044216 A1*  4/2002  Cha .................. G06F 1/1616
                                                348/376
(Continued)

FOREIGN PATENT DOCUMENTS

CN  202025253 U  11/2011
CN  103076854 A  5/2013
(Continued)

OTHER PUBLICATIONS

Chinese Patent Office, 1st Office Action dated Sep. 5, 2017 re Application of Lenovo (Beijing) Co., Ltd., No. 201511032747.6, filed Dec. 31, 2015.

*Primary Examiner* — Roberto Velez
*Assistant Examiner* — Tuan H Le
(74) *Attorney, Agent, or Firm* — Patrick J. Daugherty; Daugherty & Del Zoppo Co., LPA

(57) ABSTRACT

Embodiments of the present invention provide electronic devices, information processing methods and computer programs products wherein collecting units are used for collecting images. A display unit can be used for displaying images collected by the collecting unit on a first plane. A collecting support can be used for installing the collecting unit, wherein the collecting support comprises: a first movable support, arranged on the case of the display unit through a first rotating shaft, which can rotate in a second plane perpendicular to the first plane; a second movable support, arranged on the first movable support through a second rotating shaft, which can rotate relative to the first movable support in the second plane; and wherein the collecting unit is arranged on the second movable support.

20 Claims, 8 Drawing Sheets

(51) Int. Cl.
*G03B 17/56* (2006.01)
*G03B 15/02* (2006.01)

(56) References Cited

U.S. PATENT DOCUMENTS

| | | | |
|---|---|---|---|
| 2005/0151042 A1* | 7/2005 | Watson | F16M 11/14 |
| | | | 248/226.11 |
| 2010/0053409 A1 | 3/2010 | Chang | |
| 2012/0001999 A1* | 1/2012 | Schirdewahn | H04N 7/142 |
| | | | 348/14.01 |
| 2012/0120299 A1* | 5/2012 | Li | H04M 1/0264 |
| | | | 348/335 |

FOREIGN PATENT DOCUMENTS

| | | |
|---|---|---|
| CN | 104243831 A | 12/2014 |
| CN | 104965567 A | 10/2015 |
| JP | H11284882 A | 10/1999 |

* cited by examiner

ELECTRONIC DEVICE COMPRISING A SUPPORT DEVICE TO WHICH AN IMAGING DEVICE IS COUPLED

FIELD OF THE INVENTION

The present invention relates to the field of electronic technology, more particularly, to an electronic device and an information processing method.

BACKGROUND

With the development of electronic technology, the capabilities of electronic devices are becoming more and more powerful. For example, cameras and other structures for collecting images can now be arranged on mobile phones, tablets, or desktop computers. However, these collecting units are fixed on the electronic devices and their positions cannot be changed, which leads to a limited collection angle and the inability to meet some image collection requirements of users. Clearly, electronic devices are not sufficiently "smart", as the satisfaction degree of users is low.

SUMMARY

A first aspect of the invention is an electronic device that includes a display unit, a support device coupled to the display unit, and an imaging device coupled to the support device. The support device includes a first shaft is coupled to the display unit and rotatable relative to the display unit, and a second shaft coupled to the first shaft and rotatable relative to the first shaft.

Another aspect of the invention is a method for movably connecting an imaging device to a display unit, the method including coupling a support device to a display unit, and coupling an imaging device to the support device, wherein the support device includes a first shaft that is coupled to the display unit and rotatable relative to the display unit, and a second shaft coupled to the first shaft and rotatable relative to the first shaft.

Another aspect of the invention is a computer program product for movably connecting an imaging device to a display unit. The computer program product includes a computer readable storage medium having computer readable program code embodied therewith, wherein the computer readable storage medium is not a transitory signal per se. The computer readable program code includes instructions for execution by a processing unit that cause the processing unit to select an image output mode for an imaging device to output images in response to receiving a signal from a control key that is disposed on a support device that indicates that the control key is being operated, wherein the support device is coupled to a display unit, the imaging device is coupled to the support device, the support device comprises a first shaft which is coupled to the display unit and rotatable relative to the display unit, and the support device comprises a second shaft which is coupled to the first shaft and rotatable relative to the first shaft.

Some optional features have been defined in the dependent claims. For instance, where the display unit displays images on a first plane, the support device may include a first movable support arranged on a case of the display unit through the first shaft to rotate in a second plane perpendicular to the first plane, wherein the first movable support can move relative to the display unit in the first plane so as to change a space between the first movable support and a first edge of the display unit, and the support device includes a second movable support arranged on the first movable support through the second shaft to rotate relative to the first movable support in the second plane and a third plane that is perpendicular to the first and second planes. Some aspects further comprise a luminescent unit connected to the second movable support; a first control key connected to the support device configured to receive and select an image output mode for the imaging device to output images, and processing units that run control keys for intercepting drives or services, generating notification messages in response to intercepting a signal that the first control key is being operated, and determining an image output mode of the imaging device in response to receiving the notification message from the processing unit.

DETAILED DESCRIPTION

Embodiment 1

Figure 1:
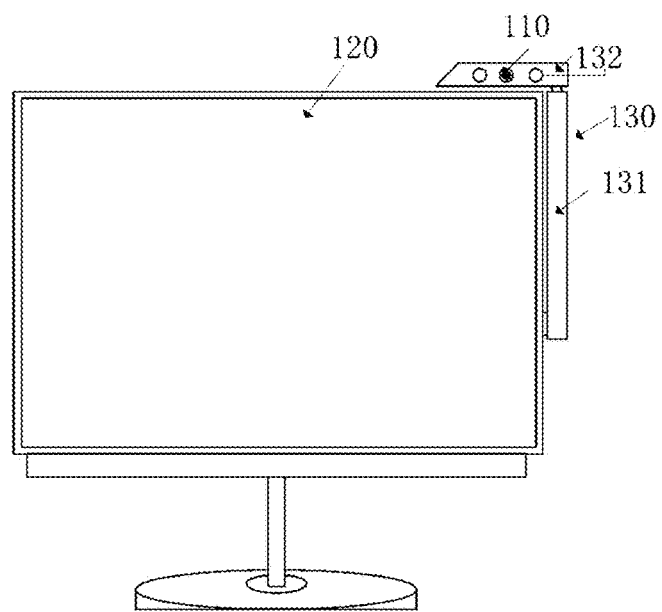
FIG. 1 to FIG. 6 show an electronic device according to embodiments of the present invention.
Figure 4:
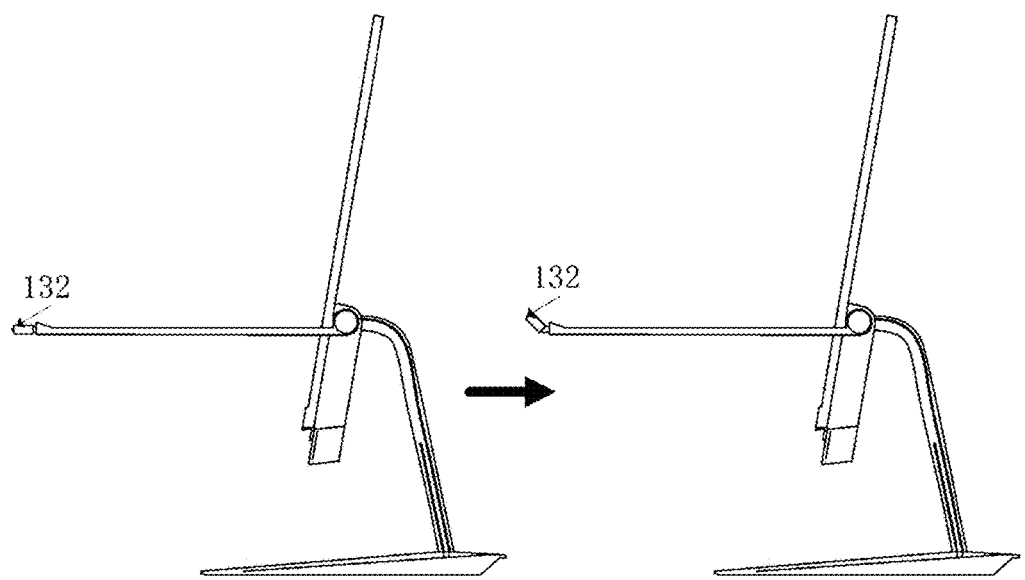

As shown in FIG. 1 and FIG. 4, embodiments of the present invention provide an electronic device, comprising:

an imaging device (shown as a collecting unit 110), which can be used for collecting images;

a display unit 120, which can be used for displaying images collected by the collecting unit on a first plane;

a support device (shown as a collecting support 130), used for installing the collecting unit;

the collecting support 130 comprises:

a first movable support 131, arranged on the case of the display unit 120 through a first rotating shaft, can rotate in a second plane perpendicular to the first plane;

a second movable support 132, arranged on the first movable support 131 through a second rotating shaft, can rotate, relative to the first movable support 131, in the second plane; and the collecting unit 110 is arranged on the second movable support 132.

Figure 2:
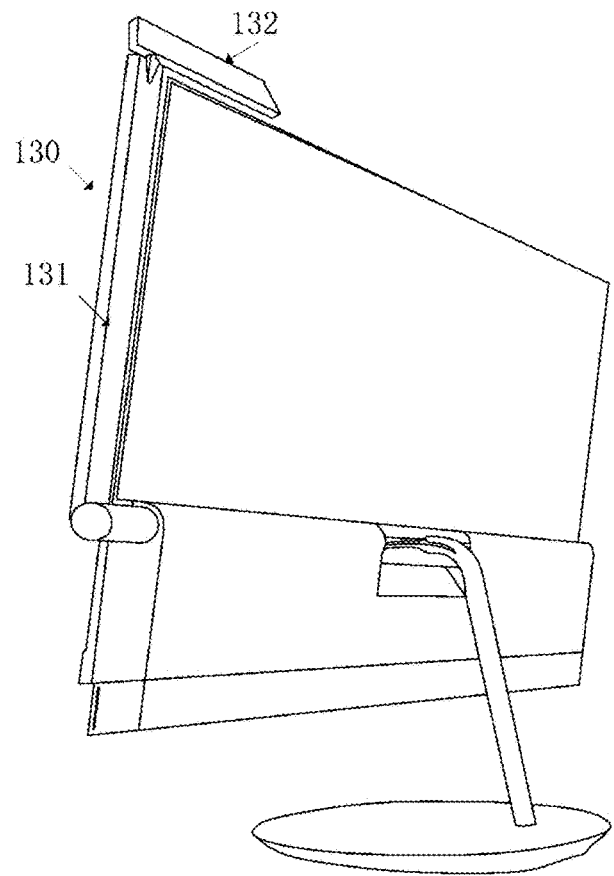

Electronic devices of this embodiment can be various types of electronic devices, such as desktop computers, notebook computers, mobile phones or tablet computers and other electronic devices, etc. FIG. 1 to FIG. 4 take desktop computer as an example to provide graphic illustration, but it shall be not limited to desktop computer in concrete implementation. FIG. 1 is a front view of the electronic device; FIG. 2 is a back view of FIG. 1.

In this embodiment, the electronic device comprises a collecting support 130, and the collecting support 130 is divided into two parts: a first movable support 131 and a second movable support 132. Both the first movable support 131 and the second movable support 132 can rotate. As shown in FIG. 1, the first plane is the plane where the display surface of the display unit 120 is in. The display unit can display information in the first plane. The information displayed includes collected images of the collecting unit 110, etc.

Figure 3:
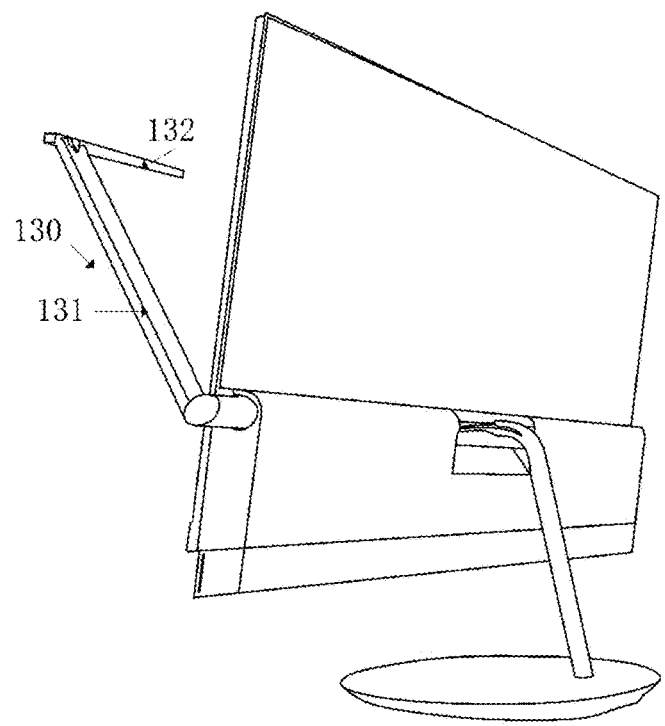

The first movable support is located on the surface of display unit 120, and can rotate in the second plane which is perpendicular to the first plane. FIG. 3 and FIG. 4 are views of different positions of the first movable support 131 when rotating in the second plane. After the first movable support 131 begins rotating, it forms a certain angle with the plane where the display unit 120 is in. FIG. 4 contains the state of the second movable support 132 after rotating. After the second movable support 132 begins rotating, it forms different angles with the plane where the first movable support 131 is in.

Figure 7:
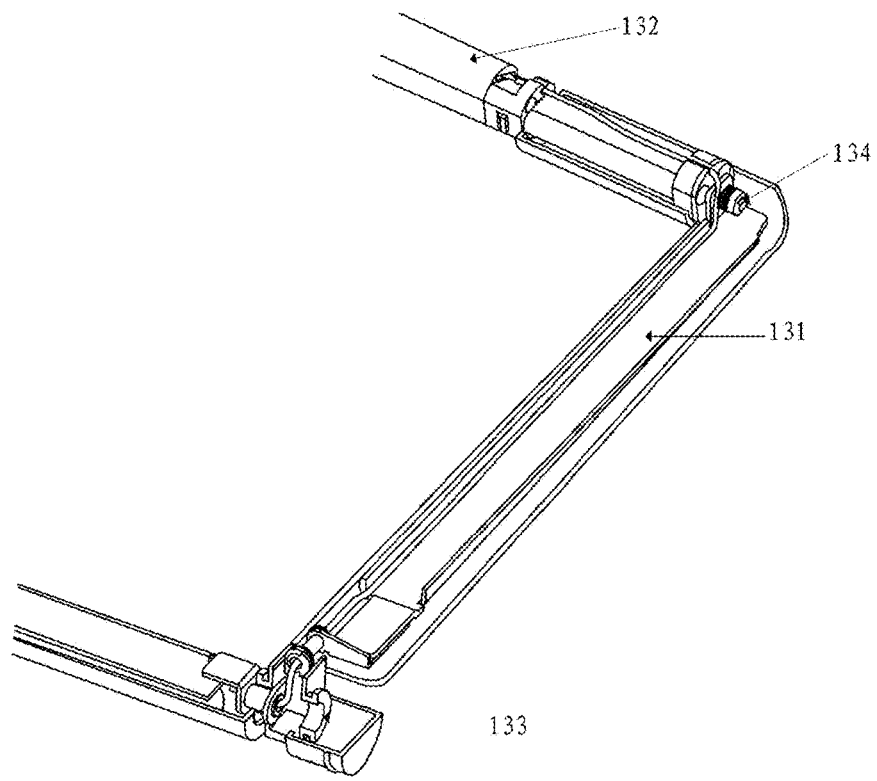
FIG. 7 and FIG. 8 show a collecting unit according to embodiments of the present invention.
Figure 8:
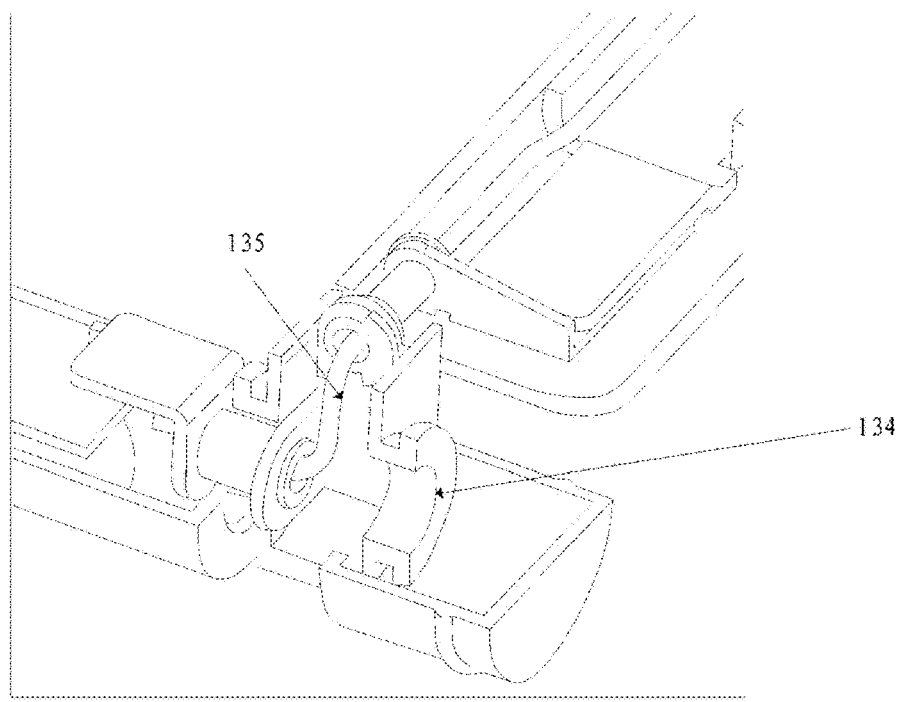

FIG. 7 and FIG. 8 show a collecting support 130 according to any one of the embodiments of the present invention. In FIG. 7, it shows the first movable support 131, the second movable support 132, and the first movable support 131 is connected with the second movable support 132 by the second rotating shaft 135. The first movable support 131 is arranged on the case of the display unit 120 through the first rotating shaft 134. In this embodiment, the first rotating shaft 134 and the second rotating shaft 135 can be a hollow shaft, and the hollow part of the hollow shaft can be used to put the cable of the collecting unit 110. The cable can power the collecting unit 110 from the power supply of the electronic device, and can interact with signals between other information processing structures and the collecting unit 110, such as, transfer image collecting instructions or image date, etc. between the image processor and the collecting unit 110.

It's clear that after the electronic device introduced the collecting support 130, the collecting unit 110, arranged on the collecting support 120, can conveniently use collecting support 120 to rotate to different angle to collect image, thus meeting user's demand of collecting images at different angles and improving the applicable scene scope of the electronic devices.

Embodiment 2

As shown in FIG. 1 and FIG. 4, embodiments of the present invention provide an electronic device, comprising:
a collecting unit 110, which can be used for collecting images;
a display unit 120, which can be used for displaying images collected by the collecting unit on a first plane;
a collecting support 130, used for installing the collecting unit;
the collecting support 130 comprises:
a first movable support 131, arranged on the case of the display unit 120 through a first rotating shaft, can rotate in a second plane perpendicular to the first plane;
a second movable support 132, arranged on the first movable support 131 through a second rotating shaft, can rotate, relative to the first movable support 131, in the second plane;
the collecting unit 110 is arranged on the second movable support 132.

Figure 5:
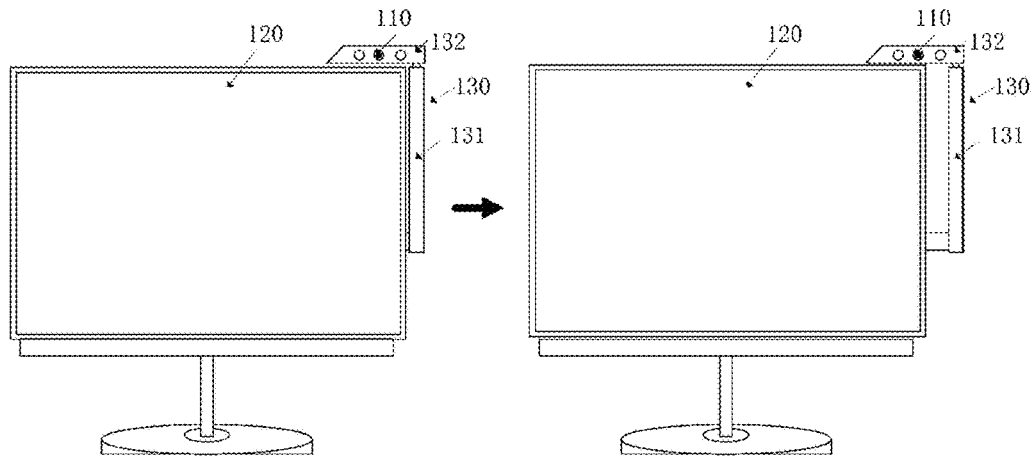

As shown in FIG. 5, the first movable support 131 can further move, relative to the display unit 120, on the first plane, in order to change the space between the first movable support 131 and a first edge of the display unit 120. It is clear that, in the left side of FIG. 5, the space between the first movable support 131 and the first edge of the display unit 120 is less than the space between the first movable support 131 and the first edge of the display unit 120, shown in the right side of FIG. 5. The first edge refers to the edge that the display unit 120 used to configure the first movable support 131.

Figure 6:
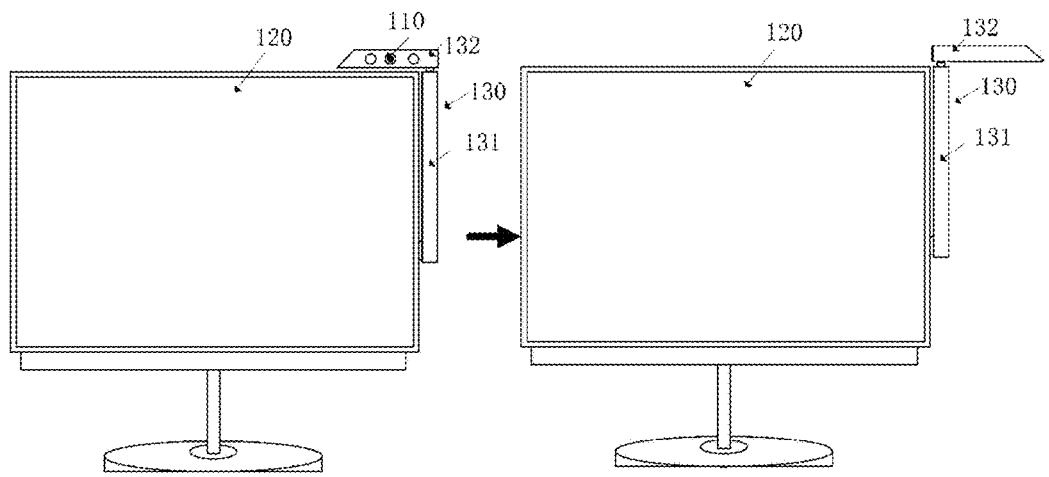

As shown in FIG. 6, the second movable support 132 can further rotate, relative to the first movable support 131, in the third plane; the third plane is perpendicular to the first and second planes. As shown in the left side of FIG. 6, it is the front view of the second movable support 132, and as shown in the right figure of FIG. 6, it is the back view of the second movable support 132 after rotating in the third plane.

Specifically, the first movable support 131 can be connected with the first edge of the display unit 120 by telescopic rod. In this way, the space to the first edge of the display unit 120 can be changed through the adjustment of the telescopic rod. The second movable support 132 in the third plane is connect with the first movable support 131 with a rotating shaft, in this way the second movable support 132 can rotate in the third plane towards the first movable support 131.

In this embodiment, the structure design of the first movable support 131 and the second movable support 132 can make the collecting unit 110 on the collecting support 130 face different positions through changing the state of the collecting support, thus meeting the image collecting demand of collecting at different scenarios.

Embodiment 3

As shown in FIG. 1 and FIG. 4, embodiments of the present invention provide an electronic device, comprising:
a collecting unit 110, which can be used for collecting images;
a display unit 120, which can be used for displaying images collected by the collecting unit on a first plane;
a collecting support 130, used for installing the collecting unit;
the collecting support 130 comprises:
a first movable support 131, arranged on the case of the display unit 120 through a first rotating shaft, can rotate in a second plane perpendicular to the first plane;
a second movable support 132, arranged on the first movable support 131 through a second rotating shaft, can rotate, relative to the first movable support 131, in the second plane;
the collecting unit 110 is arranged on the second movable support 132.

When the first movable support 131 is in a first position relative to the display unit 120, the first movable support and a display surface of the display unit are on the first plane; when the first movable support 131 is in a second position relative to the display unit, the first movable support 131 and the display surface form a first angle;
when the second movable support 132 is in a third position relative to the first movable support 131, the second movable support 132 and the first movable support 131 are on the same plane; when the second movable support 132 is in a fourth position relative to the first movable support 131, the second movable support 132 and the first movable support 131 form a second angle; wherein when the first movable support 131 is in the first position and the second movable support 132 is in the third position, the first movable support 131 and the second movable support 132 are on the first plane.

The electronic device is in the state as shown in FIG. 1 and FIG. 2, and the first movable support 131 is in the first position towards the display unit 120. The electronic device is in the state as shown in FIG. 3 and FIG. 4, and the first movable support 131 is in the second position towards the display unit 120.

The electronic device is in the state as shown in FIG. 1, and the second movable support 132 is in the third position towards the first movable support 131. In the right side of FIG. 4, the second movable support 132 of the electronic device is in the fourth position towards the first movable support 131.

Based on the above two embodiments, this embodiment specifies the position changes of the collecting support 130 towards display unit 120, also describes the position changes between the first movable support 131 and the second movable support 132 in collecting support 130. Once again, it reflects that the introducing of collecting support can make the display unit 120 stay in different position, thus meeting the demand of collecting images at different scenarios and different angles.

Embodiment 4

As shown in FIG. 1 and FIG. 4, embodiments of the present invention provide an electronic device, comprising:

a collecting unit 110, which can be used for collecting images;

a display unit 120, which can be used for displaying images collected by the collecting unit on a first plane;

a collecting support 130, used for installing the collecting unit;

the collecting support 130 comprises:

a first movable support 131, arranged on the case of the display unit 120 through a first rotating shaft, can rotate in a second plane perpendicular to the first plane;

a second movable support 132, arranged on the first movable support 131 through a second rotating shaft, can rotate, relative to the first movable support 131, in the second plane;

the collecting unit 110 is arranged on the second movable support 132.

When the first movable support 131 is in a first position relative to the display unit 120, the first movable support and a display surface of the display unit are on the first plane; when the first movable support 131 is in a second position relative to the display unit, the first movable support 131 and the display surface form a first angle;

when the second movable support 132 is in a third position relative to the first movable support 131, the second movable support 132 and the first movable support 131 are on the same plane; when the second movable support 132 is in a fourth position relative to the first movable support 131, the second movable support 132 and the first movable support 131 form a second angle; wherein when the first movable support 131 is in the first position and the second movable support 132 is in the third position, the first movable support 131 and the second movable support 132 are on the first plane.

When the first movable support 131 is in the first position and the second movable support 132 is in the third position, the first movable support 131 is at the first edge of the display unit, and the second movable support 132 is at the second edge of the display unit; the first edge being adjacent to the second edge. As shown in FIG. 1, the state of the electronic device is that the first movable support 131 is in the first position, and the second movable support 132 is in the third position, in this way, the first movable support 131, the second movable support 132 and the display unit 120 can be in the same plane, which is the first plane. Usually, the state shown in FIG. 1 is the initial state of the electronic device.

In short, through changing the position of the collecting support 130, the electronic device of this embodiment can make the collecting unit 110 locate in different locations or angles, thus collecting images in different positions and angles.

Embodiment 5

As shown in FIG. 1 and FIG. 4, embodiments of the present invention provide an electronic device, comprising:

a collecting unit 110, which can be used for collecting images;

a display unit 120, which can be used for displaying images collected by the collecting unit on a first plane;

a collecting support 130, used for installing the collecting unit;

the collecting support 130 comprises:

a first movable support 131, arranged on the case of the display unit 120 through a first rotating shaft, can rotate in a second plane perpendicular to the first plane;

a second movable support 132, arranged on the first movable support 131 through a second rotating shaft, can rotate, relative to the first movable support 131, in the second plane;

the collecting unit 110 is arranged on the second movable support 132.

Figure 9:
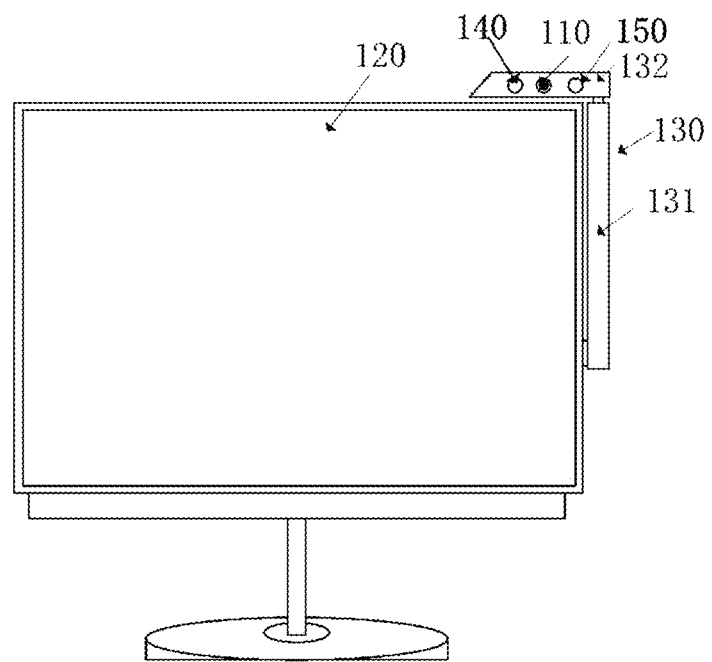
FIG. 9 shows another electronic device according to embodiments of the present invention.

As shown in FIG. 9, a luminescent unit 140 is also arranged on the second movable support 132.

The luminescent unit 140 on the second movable support 132 can provide environment light for collecting unit 110 to collect images, particularly suitable for collecting images under bad light conditions, such as night illumination conditions, avoiding bad collecting results of collecting images with flash light.

At the same time, the luminescent unit 140 on the second movable support 132 increases the function of the electronic device, in this way, the electronic device can be used as a lighting source. For example, the position of the luminescent unit 140 can be changed through moving the collecting support 130, thus achieve a lamp lighting effect.

Figure 10:
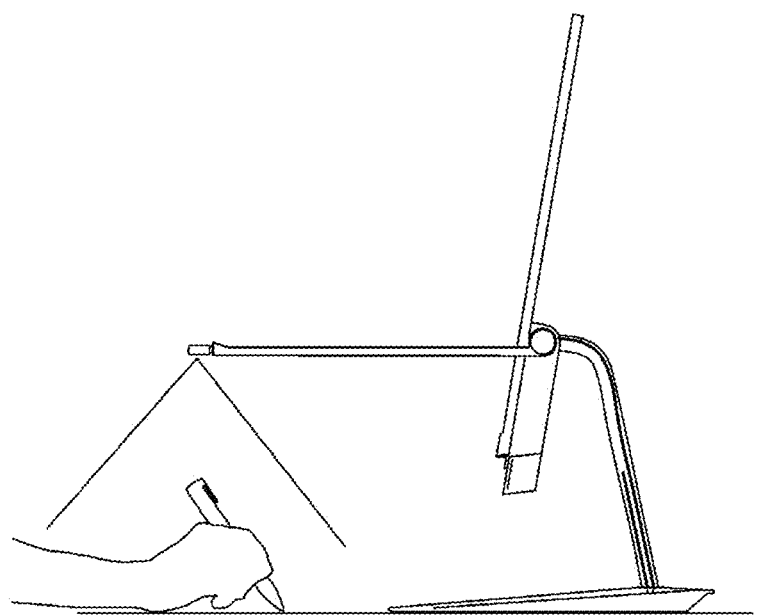
FIG. 10 shows the luminous effect of an electronic device according to embodiments of the present invention.

The luminescent unit 140 in this embodiment and the collecting unit 110 can be arranged on the same side of the second movable support 132, and can be arranged on different side of the second movable support 132. As shown in FIG. 10, a luminescent unit is arranged on the second movable support 132. The position of the luminescent unit 140 can be changed by rotating the first movable support 131 of the collecting support, thus forming a lighting source can be used to writing and reading.

The electronic device in this embodiment also used the collecting support 130 as the lighting support for luminescent unit 140. It can provide light sources which can meet various demands. The luminescent unit 140 in this embodiment can be diode LED light source, incandescent lamp light source, and can also be a cold cathode tube light.

Embodiment 6

As shown in FIG. 1 and FIG. 4, embodiments of the present invention provide an electronic device, comprising:

a collecting unit 110, which can be used for collecting images;

a display unit 120, which can be used for displaying images collected by the collecting unit on a first plane;

a collecting support 130, used for installing the collecting unit;

the collecting support 130 comprises:

a first movable support 131, arranged on the case of the display unit 120 through a first rotating shaft, can rotate in a second plane perpendicular to the first plane;

a second movable support 132, arranged on the first movable support 131 through a second rotating shaft, can rotate, relative to the first movable support 131, in the second plane;

the collecting unit 110 is arranged on the second movable support 132.

A first control key 150 is also arranged on the collecting support 130;

the first control key 150 is used to receive and select an image output mode for the collecting unit 110 to output images.

In this embodiment, the first control key 150 is a physical key and can come in the form of a rotary key and a scalable key. In short, the controls a user operates can be detected through the first control key. The first control key 150 can be set on each outer surface of the collecting support 130. In order to facilitate user operation, it can be fixed on the first movable support 131 and can also be fixed on the second movable support 132. In FIG. 9, the first control key 150 is fixed on the first movable support 131.

In this embodiment, the image output mode at least includes two kinds, one is first output mode, and the other is same-direction output mode. The images outputted by the first output mode are opposite with the images outputted by the same-direction output mode. For example, in FIG. 11, the left side with dotted box is a real scene the user sees. The right side is a view of two kinds of image output mode for collected images. In the image outputted by the first output mode, the image object is opposite to the direction the user sees. For example, the image object A and image object B in the image outputted by the first image output mode are opposite to the real scene the user sees, while the image outputted by the second output mode is consistent with the real scene the user sees.

In this embodiment, conversions between two output modes can be achieved by the first control key 150, thus improving the intelligence of the electronic devices, meeting the demands of view different images, and improving the satisfaction degree of users.

Embodiment 7

As shown in FIG. 1 and FIG. 4, embodiments of the present invention provide an electronic device, comprising:

a collecting unit 110, which can be used for collecting images;

a display unit 120, which can be used for displaying images collected by the collecting unit on a first plane;

a collecting support 130, used for installing the collecting unit;

the collecting support 130 comprises:

a first movable support 131, arranged on the case of the display unit 120 through a first rotating shaft, can rotate in a second plane perpendicular to the first plane;

a second movable support 132, arranged on the first movable support 131 through a second rotating shaft, can rotate, relative to the first movable support 131, in the second plane;

the collecting unit 110 is arranged on the second movable support 132.

A first control key 150 is also arranged on the collecting support 130;

the first control key 150 is used to receive and select an image output mode for the collecting unit 110 to output images.

Figure 12:
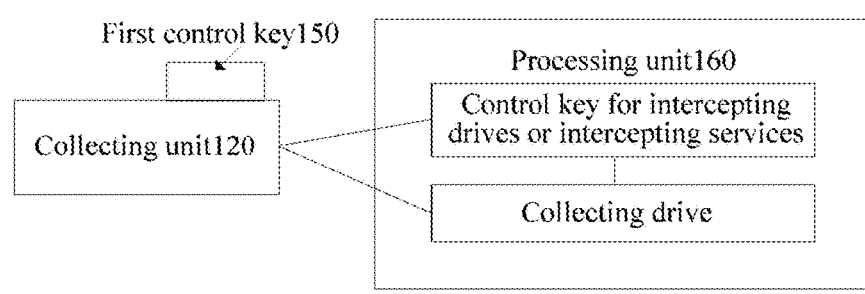
FIG. 12 is a schematic drawing of an electronic device according to other embodiments of the present invention.

As shown in FIG. 12, the electronic device further comprises a processing unit;

The processing unit 160 is used to run a control key for intercepting drives or for intercepting services, and generate a notification message when it intercepts the first control key being operated;

the collecting unit 110 is specifically used to receive a notification message from the processing unit 160 and determine the image output mode of the collecting unit 110.

In this embodiment, the processing unit includes various types of processors or processing circuits, and the processors including CPU, microprocessor, output signal processor or programmable array, etc. The processing circuits include application-specific integrated circuit. The processors or processing circuits can achieve control key interception driving and control key interception service through executing executable code, thus detecting the user pressed or rotated the first control key 150. In this embodiment, the passive operations include being pressed or being rotated, etc.

As a further improvement of this embodiment, the collecting unit 110 comprises:

a collecting drive module, used to receive a notification message from the processing unit and determine the image output mode of the collecting unit.

In this embodiment, the collecting driver module is a structure that can provide driving force for collecting unit 110. The processing unit has different collecting drives. The collecting drive used by processing unit 160 can be collecting drive services, wherein the collecting drive service can be the service that provides control signals of collecting driver module for collecting unit 110.

In short, the electronic device in this embodiment can easily control the image output mode, meeting the image output demands of various users.

Embodiment 8

As shown in FIG. 1 and FIG. 4, embodiments of the present invention provide an electronic device, comprising:

a collecting unit 110, which can be used for collecting images;

a display unit 120, which can be used for displaying images collected by the collecting unit on a first plane;

a collecting support 130, used for installing the collecting unit;

the collecting support 130 comprises:

a first movable support 131, arranged on the case of the display unit 120 through a first rotating shaft, can rotate in a second plane perpendicular to the first plane;

a second movable support 132, arranged on the first movable support 131 through a second rotating shaft, can rotate, relative to the first movable support 131, in the second plane;

the collecting unit 110 is arranged on the second movable support 132.

A first control key 150 is also arranged on the collecting support 130;

the first control key 150 is used to receive and select an image output mode for the collecting unit 110 to output images.

The collecting unit 110 comprises:

a collecting module, used to collect image data;

a processing unit, used to receive a notification message from the processing unit 160 and determine the image output mode of the collecting unit 110, and process the image data according to the image output mode, then generate a collected image in accordance with the image output mode.

In this embodiment, the collecting module includes the structures that can collect light and form image data, such as cameras and photographic film, etc. The processing unit includes the structures that can form the corresponding images according to the image output mode. For example, the processing unit generates a collected image based on the image output mode. In this way, the subsequent display unit can output mirror image and synthetic image according to the processed collected images.

Embodiment 9

Figure 13:
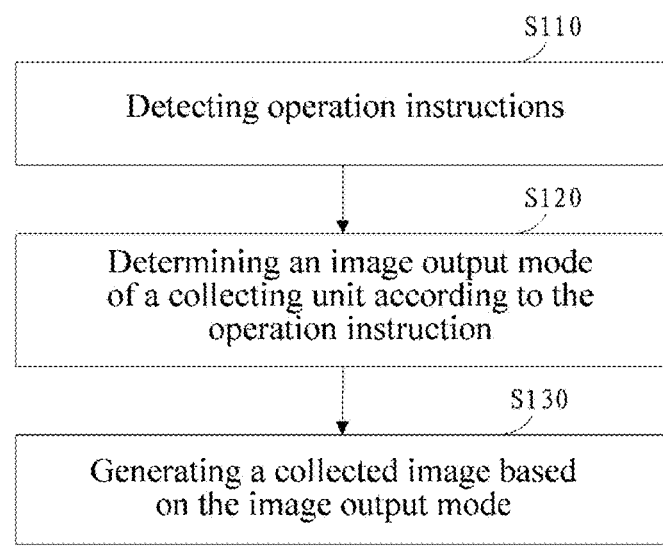
FIG. 13 is a flow-chart for the first type of information processing method according to embodiments of the present invention.

As shown in FIG. 13, this embodiment provides an information processing method, comprising:

Step S110: detecting operation instructions;

Step S120: determining an image output mode of a collecting unit according to the operation instruction;

Step S130: generating a collected image based on the image output mode.

The information processing method of this embodiment can be applied to the electronic device provided in the embodiment of the present invention, for example, apply to the electronic devices shown in FIG. 1 to FIG. 10. Electronic devices can be various types of electronic devices, such as mobile phones, tablets, laptops, etc. For example, in step S110, operation instructions can be detected through the first control key in the embodiment. Human-machine interface, such as mouse or keyboard, touch screen, voice collecting and recognition structure, etc., can also detect operation instructions. The detection method is not limited to the first control key. If using the first control key to detect operation instructions, the operation instructions for changing image output mode or determining image output mode are detected when the first control key is pressed or rotated or touched.

In step S120 when operation instructions are detected, an image output mode of the collecting unit will be determined. In step S130: the collecting unit will generate a collected image based on the image output mode. For example, if the operation instruction is for changing image output mode, then the current image output mode will be changed to another image output mode. If the operation instruction is for determining image output mode, then, according to operation instruction, one image output mode will be chosen from the image output mode as the image output mode of this image collecting.

Figure 11:
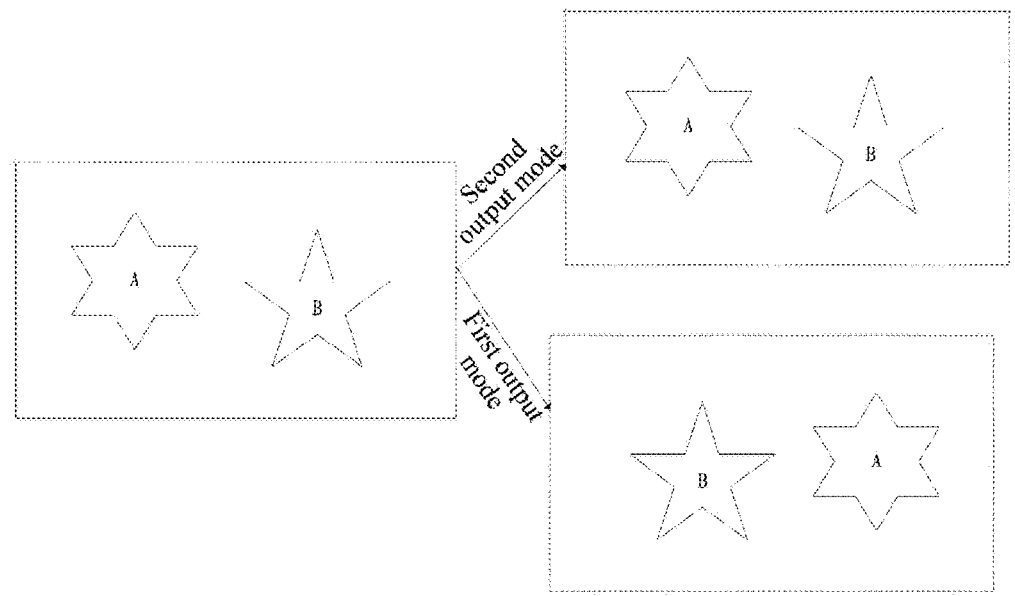
FIG. 11 is a relationship diagram between two kinds of image output modes and real scenes according to embodiments of the present invention.

The image output modes include a first output mode and a second output mode; the image outputted with the first output mode and image outputted with the second output mode have opposite graphic objects on a first dimension. As shown in FIG. 11, it is a comparison between the view of first output mode and the real scene. In FIG. 11, it's clear that graphic object A and graphic object B are opposite in horizontal direction. The horizontal direction is the first dimension.

Figure 14:
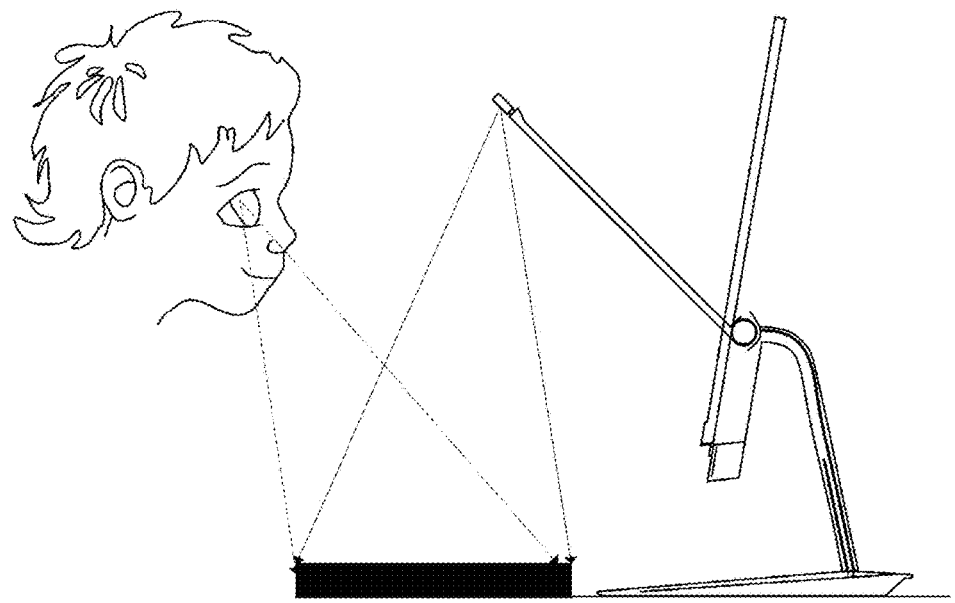
FIG. 14 is a view of image collection according to embodiments of the present invention.

FIG. 14 is a view of image collection according to the embodiment of the present invention, wherein it's clear that user's views and the collecting direction of the collecting unit are on different sides of the collection object. In FIG. 14, the collection object is represented by black squares. The user's view is represented by a dotted arrow, and the collecting direction of the collecting unit is represented by solid arrow. If the collected image is presented according to the image it sensed, it is clear the image will be opposite with the image the user sees in the horizontal direction. But in the collected image generated by using the second output mode in this embodiment, the image direction is consistent with the real scene the user sees. In this way, the user can collect images that are consistent with the user's view by using collecting unit directly, thus improving the intelligence of the electronic devices and the satisfaction degree of users.

When the collecting angle of the collecting unit and the view of the user are opposite on the first dimension, if the collecting unit uses the second output mode, the collected image is in the same direction with the user's view; if the collecting unit uses the first output mode, the collected image is generated according to the collecting angle of the collecting unit. When the second output mode is being used, a preset algorithm can be used in the step S130 to change the position of each pixel in the collected image generated by collecting unit, thus forming collected image that is in the same direction with the user's view.

As a further improvement of this embodiment, the Step S110 comprises:

using a control key for intercepting drives or intercepting services to intercept a user operation on a first control key;

generating a notification message when detecting a user operation;

The Step S120 includes:

the collecting unit determines the image output mode based on the notification message.

In this embodiment, interception driving and interception service are used to intercept user operation, and generate notification messages when user operation is detected, thus determining the image output mode in a simple way.

A specific example will be provided below with reference to this embodiment.

Figure 15:
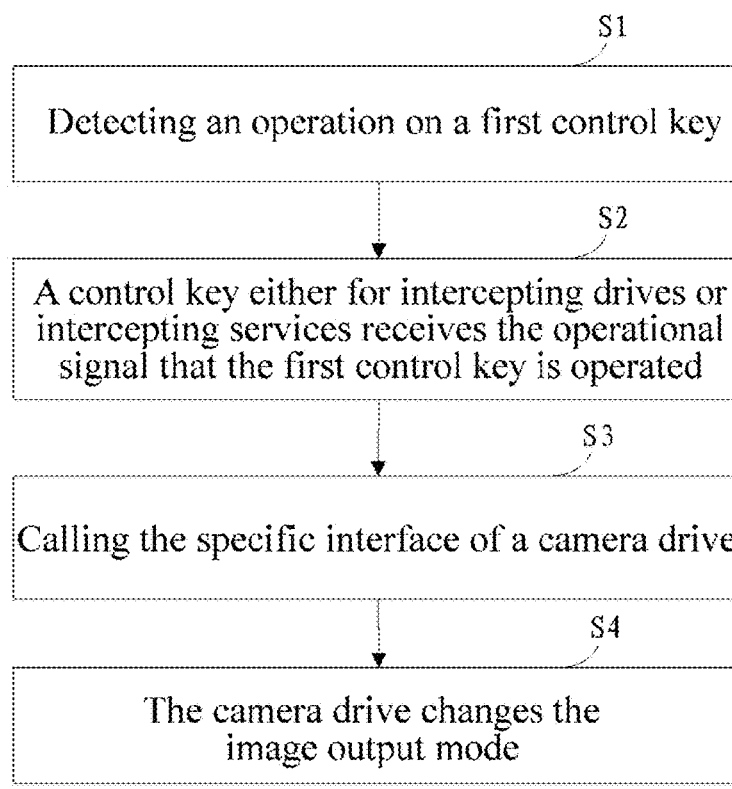
FIG. 15 is schematic flow-chart for the second type of information processing method according to embodiments of the present invention.

As shown in FIG. 15, this specific example provides and information processing method, comprising:

Step S1: Detecting an operation on a first control key. For example, the first control key is pressed or rotated, and generate corresponding electrical signal.

Step S2: A control key either for intercepting drives or intercepting services receives the operational signal that the first control key is operated. The operational signal can be the electrical signal.

Step S3: When operational signal is detected, the specific interface of a camera drive will be called. This specific interface is used to change the output mode or specify the image output mode. The specific interface includes various input and output interface.

Step S4: The camera driving changes image output mode, wherein changes will be made according to the information outputted by specific interface.

It should be understood that the devices and methods disclosed in the embodiments of the present application may be implemented in other ways. The device embodiments as described above are only for illustration, for example, the unit division is only a logical function division, and may be partially implemented in other manners. For example, a plurality of units or components can be combined, or can be integrated into another system. Some features may be omitted, or may not be executed. Additionally, coupling, direct coupling, or communication connections among the component parts as shown or discussed may be implemented through some interface(s), and indirect coupling or communication connections of devices or units may be in an electrical, mechanical, or other form.

The units described above as separate components may be or may not be separated physically. The components illustrated as units may be or may not be physical units, which can be located in one place, and can also be distributed to multiple network units; the object of the present solution of the embodiment can be achieved by some or all of the units, according to actual requirements.

Additionally, each function unit in the embodiment of the present invention can be integrated in one processing module, or each unit work separately as one unit, or two or more unit integrated into one unit; the integrated unit can come in the form of hardware or in the form of a hardware plus software functional unit.

It may be appreciated by those of ordinary skill in the art that all steps or part of the steps for achieving the method embodiment can be completed by using program instruction related hardware. The program can be stored in computer readable storage medium. When the program begins executing, the steps of the method embodiment will be executed; the storage medium includes various medium that can store program code, such as: mobile storage devices, Read-Only Memory, Random Access Memory, disk or CD, etc.

The above are only some particular implementations of the present invention, and the protection scope of the present invention is not limited thereto. Variations or alterations that are within the technical scope as disclosed in the present invention and may be readily conceived by those skilled in the art fall within the protection scope of the present invention. Accordingly, the protection scope of the present invention is defined by the claims.

What is claimed is:

1. An electronic device, comprising:
a display unit which displays images on a first plane;
a support device coupled to the display unit; and
an imaging device coupled to the support device;
the support device comprising a first shaft which is extendably coupled to the display unit and the support device is rotatable about an axis of the first shaft relative to the display unit in a second plane perpendicular to the first plane;
the support device comprising a second shaft which is coupled to the first shaft and rotatable relative to the first shaft, wherein the first shaft of the support device is moveable along a rotational axis which moves the second shaft of the support device away from the display unit; and
wherein the support device comprises a first movable support coupled to the first shaft to rotate, wherein the first shaft extendably coupled to the display unit moves the first moveable support along the axis of the first shaft which changes space between the first moveable support and a first edge of the display unit.

2. The electronic device according to claim 1,
wherein the support device comprises a second movable support arranged on the first movable support through the second shaft to rotate relative to the first movable support in the second plane and a third plane that is perpendicular to the first and second planes.

3. The electronic device according to claim 2, wherein:
if the first shaft is in a first position relative to the display unit, the first movable support and a display surface of the display unit are on the first plane;
if the first movable support is in a second position relative to the display unit, the first movable support and the display surface form a first angle;
if the second movable support is in a third position relative to the first movable support, the second movable support and the first movable support are on the same plane;
if the second movable support is in a fourth position relative to the first movable support, the second movable support and the first movable support form a second angle; and
if the first movable support is in the first position and the second movable support is in the third position, the first movable support and the second movable support are on the first plane.

4. The electronic device according to claim 3, wherein:
if the first movable support is in the first position and the second movable support is in the third position, the first movable support is at the first edge of the display unit, and the second movable support is at a second edge of the display unit that is adjacent to the first edge.

5. The electronic device according to claim 2, further comprising:
a luminescent unit coupled to the second movable support.

6. The electronic device according to claim 2, further comprising:
a first control key coupled to the support device that is configured to receive and select an image output mode for the imaging device to output images.

7. The electronic device according to claim 6, further comprising:
a processing unit in circuit communication with the imaging device;
wherein the processing unit is configured to run a control key for intercepting at least one of drives and services, and to generate a notification message in response to intercepting a signal that the first control key is being operated; and
wherein the imaging device is configured to determine an image output mode of the imaging device in response to receiving the notification message from the processing unit.

8. The electronic device according to claim 7, wherein the imaging device further comprises:
a drive module that is configured to determine the image output mode of the imaging device in response to receiving the notification message from the processing unit.

9. The electronic device according to claim 7,
wherein the imaging device is configured to, in response to receiving a notification message from the processing unit, determine the image output mode of the imaging device, process the image data obtained according to the determined image output mode, and generate an image in accordance with the determined image output mode.

10. A method for movably connecting an imaging device to a display unit, the method comprising:
coupling a support device to a display unit which displays images on a first plane; and
coupling an imaging device to the support device;
wherein the support device comprises a first shaft that is extendably coupled to the display unit and the support device is rotatable about an axis of the first shaft relative to the display unit in a second plane perpendicular to the first plane;

wherein the support device comprises a second shaft that is coupled to the first shaft and rotatable relative to the first shaft, wherein the first shaft of the support device is moveable along a rotational axis which moves the second shaft of the support device away from the display unit; and wherein the support device comprises a first movable support coupled to the first shaft, wherein the first shaft extendably coupled to the display unit moves the first moveable support along the axis of the first shaft which changes space between the first moveable support and a first edge of the display unit.

11. The method according to claim 10, wherein the support device comprises a second movable support arranged on the first movable support through the second shaft to rotate relative to the first movable support in the second plane and a third plane that is perpendicular to the first and second planes.

12. The method of claim 11, wherein:

when the first shaft is in a first position relative to the display unit, the first movable support and a display surface of the display unit are on the first plane;

when the first movable support is in a second position relative to the display unit, the first movable support and the display surface form a first angle;

when the second movable support is in a third position relative to the first movable support, the second movable support and the first movable support are on the same plane;

when the second movable support is in a fourth position relative to the first movable support, the second movable support and the first movable support form a second angle; and when the first movable support is in the first position and the second movable support is in the third position, the first movable support and the second movable support are on the first plane.

13. The method of claim 12, wherein:

when the first movable support is in the first position and the second movable support is in the third position, the first movable support is at the first edge of the display unit, and the second movable support is at a second edge of the display unit that is adjacent to the first edge.

14. The method of claim 11, further comprising:

selecting an image output mode for the imaging device to output images in response to receiving a signal from a control key that is disposed on the support device that indicates that the control key is being operated.

15. The method according to claim 14, further comprising:

obtaining image data via the imaging device; and in response to receiving a notification message from the control key, determining an image output mode of the imaging device;

processing the image data obtained by the imaging device according to the determined image output mode; and generate an image in accordance with the determined image output mode.

16. The method of claim 14, further comprising:

determining the image output mode by selecting between a first output mode and a second output mode;

generating an image in accordance with the first output mode that comprises graphic objects located in a first orientation relative to each other with respect to a first dimension; and generating an image in accordance with the second output mode that comprises the graphic objects located in a second orientation relative to each other with respect to the first dimension that is opposite to the first orientation.

17. A computer program product for movably connecting an imaging device to a display unit, the computer program product comprising:

a computer readable storage medium having computer readable program code embodied therewith, wherein the computer readable storage medium is not a transitory signal per se, the computer readable program code comprising instructions for execution by a processing unit that cause the processing unit to:

select an image output mode for an imaging device to output images in response to receiving a signal from a control key that is disposed on a support device that indicates that the control key is being operated;

wherein the support device is coupled to a display unit that displays images in a first plane, the imaging device is coupled to the support device, the support device comprises a first movable support which is rotatably coupled to the display unit by a first shaft and the first movable support is rotatable relative to the display unit in a second plane perpendicular to the first plane, and the support device comprises a second movable support which is coupled to the first moveable support by a second shaft and rotatable relative to the first shaft in a third plane which is perpendicular to the second plane of the first movable support;

wherein the first shaft of the support device is moveable along a rotational axis which moves the second shaft of the support device away from the display unit.

18. The computer program product of claim 17, wherein the computer readable program code instructions for execution by the processing unit further cause the processing unit to:

obtain image data via the imaging device; and in response to receiving a notification message from the control key, determining an image output mode of the imaging device.

19. The computer program product of claim 18, wherein the computer readable program code instructions for execution by the processing unit further causes the processing unit to:

process the obtained image data according to the determined image output mode; and generate an image in accordance with the determined image output mode.

20. The computer program product of claim 19, wherein the computer readable program code instructions for execution by the processing unit further cause the processing unit to:

determine the image output mode by selecting between a first output mode and a second output mode;

generate the image in accordance with the first output mode that comprises graphic objects located in a first orientation relative to each other with respect to a first dimension; and generate the image in accordance with the second output mode that comprises the graphic objects located in a second orientation relative to each other with respect to the first dimension that is opposite to the first orientation.

\* \* \* \* \*